United States Patent [19]
Shibuya

[11] Patent Number: 5,890,107
[45] Date of Patent: Mar. 30, 1999

[54] SOUND SIGNAL PROCESSING CIRCUIT WHICH INDEPENDENTLY CALCULATES LEFT AND RIGHT MASK LEVELS OF SUB-BAND SOUND SAMPLES

[75] Inventor: Yoshitaka Shibuya, Tokyo, Japan

[73] Assignee: NEC Corporation, Tokyo, Japan

[21] Appl. No.: 679,578

[22] Filed: Jul. 15, 1996

[30] Foreign Application Priority Data

Jul. 15, 1995 [JP] Japan .................................. 7-201593

[51] Int. Cl.$^6$ ........................................................ G10L 3/02
[52] U.S. Cl. .......................... 704/295; 704/204; 704/229; 375/240; 341/50
[58] Field of Search ................................ 395/2.12, 2.14, 395/2.35, 2.37–2.39, 2.91–2.95; 704/227, 204, 206, 201, 200

[56] References Cited

U.S. PATENT DOCUMENTS

| | | | |
|---|---|---|---|
| 5,151,941 | 9/1992 | Nishiguchi et al. | 395/2.42 |
| 5,157,760 | 10/1992 | Akagiri | 395/2.42 |
| 5,241,603 | 8/1993 | Akagiri et al. | 395/2.14 |
| 5,268,685 | 12/1993 | Fujiwara | 341/76 |
| 5,311,561 | 5/1994 | Akagiri | 395/2.38 |
| 5,475,789 | 12/1995 | Nishiguchi | 395/2.09 |
| 5,508,949 | 4/1996 | Konstantinides | 364/725 |
| 5,553,193 | 9/1996 | Akagiri | 395/2.38 |
| 5,621,854 | 4/1997 | Hollier | 395/2.37 |
| 5,625,743 | 4/1997 | Fiocca | 395/2.14 |
| 5,632,003 | 5/1997 | Davidson et al. | 395/2.38 |
| 5,649,052 | 7/1997 | Kim | 395/2.35 |
| 5,649,053 | 7/1997 | Kim | 395/2.38 |
| 5,651,093 | 7/1997 | Nishiguchi | 395/2.38 |
| 5,654,952 | 8/1997 | Suzuki et al. | 369/124 |
| 5,661,755 | 8/1997 | Van De Kerkhof et al. | 375/242 |
| 5,687,281 | 11/1997 | Beerends et al. | 704/203 |
| 5,737,717 | 4/1998 | Akagiri et al. | 704/205 |

FOREIGN PATENT DOCUMENTS

| | | |
|---|---|---|
| H4-302532 | 10/1991 | Japan . |
| H3-247011 | 11/1991 | Japan . |
| H6-334533 | 12/1994 | Japan . |

OTHER PUBLICATIONS

Lawrence Rabiner and Biing–Hwang Juang, "Fundamentals of Speech Recognition," Prentice–Hall, 1993, pp. 77–81 and 183–190, 1993.

"Information technology—Coding of moving pictures and associated audio for digital storage media at up to about 1,5 Mbit/s," International Standard ISO/IEC 11172–3:1993 (E).

*Primary Examiner*—David R. Hudspeth
*Assistant Examiner*—Donald L. Storm
*Attorney, Agent, or Firm*—Scully, Scott Murphy and Presser

[57] ABSTRACT

A sound signal processing circuit which independently calculates left and right mask levels of sub-band sound samples. A fast Fourier transform circuit performs a fast Fourier transform on input sound samples, and outputs first power spectrum samples decreased to one-half the input sound samples. A sub-sampling circuit produces a prescribed number of second power spectrum samples by sub-sampling processing of adding power spectrum samples by a prescribed number to make a single spectrum. A mask calculating circuit calculates a mask level of second power spectrum samples by determining a contour expressed in a prescribed unit mask function for every second power spectrum sample as a mask for every power spectrum sample, and adds the masks of the respective power spectrum samples.

11 Claims, 5 Drawing Sheets

SOUND SIGNAL PROCESSING CIRCUIT WHICH INDEPENDENTLY CALCULATES LEFT AND RIGHT MASK LEVELS OF SUB-BAND SOUND SAMPLES

BACKGROUNDS OF THE INVENTION

1. Field of the Invention

The present invention relates to a sound signal processing circuit for calculating the mask level of a sound sample quantized in a sub-band encoding circuit which encodes a sound signal by dividing it for every frequency band.

2. Description of the Related Art

FIG. 7 shows the general schematic configuration of a conventional sound signal processing circuit used for ISO/IEC11172-3 (hereinafter referred to as MPEG/Audio). Each section will be described below. For example, when 1024 input sound samples 61 are entered as sample, an FFT circuit 62 performs fast Fourier transform to effect sample output of 512 power spectrum samples.

From the entered power spectrum samples, a classifying circuit 63 for classifying into a pure sound and a noise extracts maximum power spectrum samples (those larger than power spectrum samples of adjacent frequencies) as pure sound component and others as noise component, thereby classifying the entered power spectrum samples into the pure sound component and the noise component.

A sub-sampling circuit 64 integrates a prescribed number of high power spectra into one power spectrum sample by utilizing a fact that a man's sense of hearing is poor in discriminating frequencies as they are higher. The number of power spectra to be integrated is variable depending on whether the applicable power spectra belong to the pure sound component or the noise component.

A mask calculating circuit 65 determines a mask level from the sub-sampled power spectrum samples as the pure sound component and those as the noise component. The mask level means a sound level that is a minimum level a man can hear and is variable gradually according to the distribution of frequencies of sounds which are being heard by a man at that time.

Conventional calculation of a mask level will be described with reference to FIG. 8. With the sense of hearing a man has, when there is a sound, namely a power spectrum 71, sounds having its adjacent frequencies are hard to hear. In other words, a mask 72 is formed on the frequencies adjacent to the power spectrum.

Conventionally, the mask 72 has its contour (the mask's height and the inclination of its straight line) variable according to whether the power spectrum is a pure sound component or a noise component or according to the magnitude of the power spectrum.

This mask is calculated on every sub-sampled power spectrum, and the calculated results are summed up. When there are (n) power spectra in calculating the mask, calculation in the order of the first power of (n) is required to determine a mask for one power spectrum. And, this calculation is repeated on all of the (n) power spectra, and to sum up the results, the number of calculation in the order of the second power of (n) is required as a whole.

Since a real-time MPEG/Audio encoder is required to make such processing within a limited time, such a large change in the volume of processing depending on the entered sound is very inconvenient.

Since the number (n) of power spectra is arbitrary, an arithmetic unit which is fast enough to be able to deal with substantially large (n) must be used, but it becomes very large in scale because the volume of operation increases in proportion to the second power of (n). When an entered sound has an unexpectedly large value (n), processing does not catch up and fails, resulting in producing noises.

As described above, conventionally, since the mask contour was variable depending on whether the power spectrum was a pure sound component or a noise component and also depending on the magnitude of the power spectrum, there was a disadvantage that a very large volume of calculation was required to determine a mask level. Thus, the arithmetic unit used became very large in scale.

Besides, the volume of arithmetic operation was largely affected by a sound to be entered because the input sound was classified into the pure sound component and the noise component. Thus, there was a disadvantage that the processing did not catch up to the entry of a voice and fails, resulting in producing noises.

SUMMARY OF THE INVENTION

A first object of the invention is to provide a sound signal processing circuit which can decrease the volume of calculation required to compute a mask level by determining each prescribed number of power spectrum samples having a given unit mask function convoluted as a mask for every power spectrum sample and summing up the masks of respective power spectrum samples to calculate the mask level.

A second object of the invention is to provide a sound signal processing circuit which does not need to have large-scale arithmetic means on the assumption that the volume of processing would increase, because the number of power spectrum samples do not change depending on the input sound, and when the number of power spectrum samples is determined, arithmetic means having a scale suitable to processing of the determined samples can be provided.

According to one aspect of the invention, a sound signal processing circuit for calculating a mask level of a prescribed number of input sound samples quantized in advance, comprises:

fast Fourier transform means which perform fast Fourier transform on said input sound samples and output first power spectrum samples decreased to one-half the input sound samples, sub-sampling means which produce a prescribed number of second power spectrum samples by sub-sampling processing of adding said power spectrum samples by a prescribed number to make a single spectrum, and mask calculating means which calculate a mask level of said second power spectrum samples by determining a contour expressed in a prescribed unit mask function for each of said second power spectrum samples as a mask for every power spectrum sample and adding said mask of said each power spectrum sample.

In the preferred construction, the mask expressed in said unit mask function has a contour which has a given inclination on right and left sides of said power spectrum.

In another preferred construction, as to n numbers of said second power spectrum samples at frequencies f[0] to f[n−1], the i-th ($0 \leq i \leq n-1$) sample of said power spectrum samples is determined to have a magnitude a[i], a frequency f[i] and a mask inclination (p); and said unit mask function with respect to said power spectrum sample at a frequency f is determined to be $mi[f]=a[i]*10^{-p/10|f-f(i)|}$.

Also, the mask calculating means may calculate a mask level independently on right masks and left masks of said second power spectrum samples.

In another preferred construction, as to (n) numbers of said power spectrum samples at frequencies f[0] to f[n−1], said mask calculating means divide into right masks and left masks of said power spectrum samples, and sum the right masks of said respective power spectrum samples sequentially from said power spectrum sample at the frequency f[0] to calculate a mask level of the right side of said second power spectrum samples and sum the left masks of said respective power spectrum samples sequentially from said power spectrum sample at the frequency f[n−1] to calculate a mask level of the left side of said second power spectrum samples.

According to another aspect of the invention, a sound signal processing circuit for calculating a mask level of a prescribed number of input sound samples quantized in advance, comprises:

fast Fourier transform means which perform fast Fourier transform on said input sound samples and output first power spectrum samples decreased to one-half the input sound samples, sub-sampling means which produce a prescribed number of second power spectrum samples by sub-sampling processing of adding said power spectrum samples by a prescribed number to make a single spectrum, and mask calculating means which calculate a mask level of said second power spectrum samples by determining a contour expressed in a prescribed unit mask function for each of said second power spectrum samples as a mask for every power spectrum sample and adding said mask of said each power spectrum sample;

said mask calculating means dividing into right masks and left masks of said power spectrum samples, summing the right masks of said respective power spectrum samples sequentially from said power spectrum sample at a low frequency to calculate a mask level of the right side of said second power spectrum samples and summing the left masks of said respective power spectrum samples sequentially from said power spectrum sample at a high frequency to calculate a mask level of the left side of said second power spectrum samples, and adding the right masks and the left masks of said second power spectrum samples to calculate a mask level of said second power spectrum samples.

In the above-mentioned construction, as to n numbers of said second power spectrum samples at frequencies f[0] to f[n−1], the i-th ($0 \leq i \leq n-1$) sample of said power spectrum samples is determined to have a magnitude a[i], a frequency f[i] and a mask inclination (p); and said unit mask function with respect to said power spectrum sample at a frequency f is determined to be $mi[f]=a[i]*10^{-p/10|f-f(i)|}$.

In this case, as to (n) numbers of said power spectrum samples at frequencies f[0] to f[n−1], said mask calculating means divide into right masks and left masks of said power spectrum samples, and sum the right masks of said respective power spectrum samples sequentially from said power spectrum sample at the frequency f[0] to calculate a mask level of the right side of said second power spectrum samples and sum the left masks of said respective power spectrum samples sequentially from said power spectrum sample at the frequency f[n−1] to calculate a mask level of the left side of said second power spectrum samples.

Also, as to (n) numbers of said power spectrum samples at frequencies f[0] to f[n−1], the i-th sample of said power spectrum samples is determined to have a magnitude a[i], a frequency f[i], a right mask inclination(−q) and a left mask inclination (p); said mask calculating means calculate based on $mr[i]=a[i]+10^{-q/(f[i]-f[i-1])}*mr[i-1]$ the right masks of said power spectrum samples at the frequency f[i], and calculate based on $ml[i]=10-p/(f[i+1]-f[i])*(a[i+1]+ml[i+1])$ the left masks of said power spectrum samples at the frequency f[i].

In another preferred construction, the mask calculating means may have a table prepared by previously calculating $10^{-q/(f[i]-f[i-1])}$ in the operation for said right masks and a table prepared by previously calculating $10^{-p/(f[i+1]-f[i])}$ in the operation for said left masks.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENTS

Figure 1:
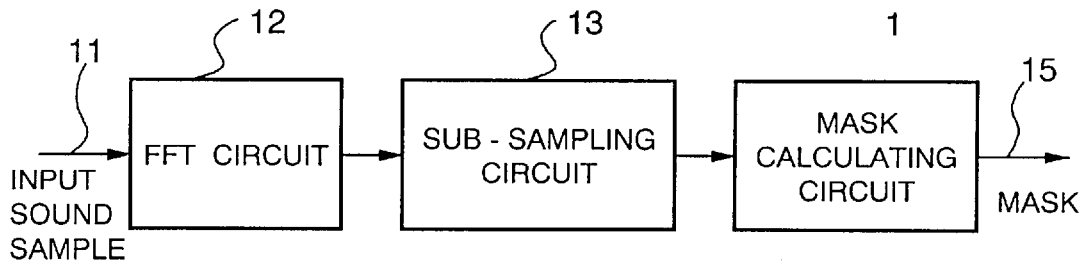
FIG. 1 is a block diagram showing a basic configuration of the sound signal processing circuit according to one embodiment of the invention.

Preferred embodiments of the invention will be described in detail with reference to the attached drawings. FIG. 1 is a block diagram showing a basic configuration of the sound signal processing circuit according to one embodiment of the invention. Respective components will be described with reference to FIG. 1. The sound signal processing circuit of this embodiment comprises an FFT circuit 12, a sub-sampling circuit 13, and a mask calculating circuit 14.

Figure 7:
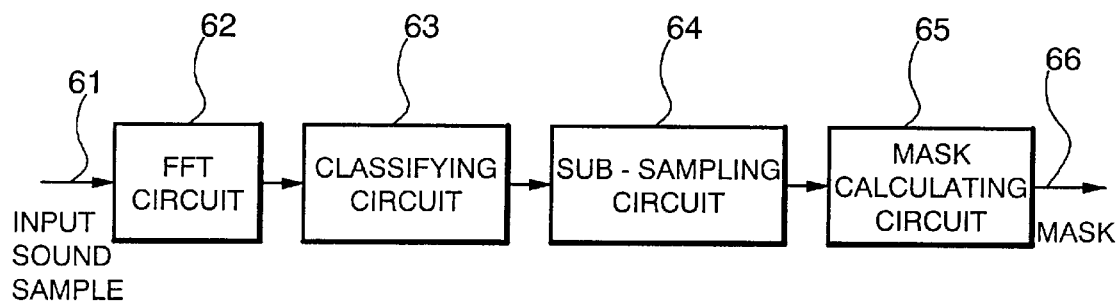
FIG. 7 is a block diagram showing the basic configuration of a conventional sound signal processing circuit.
Figure 8:
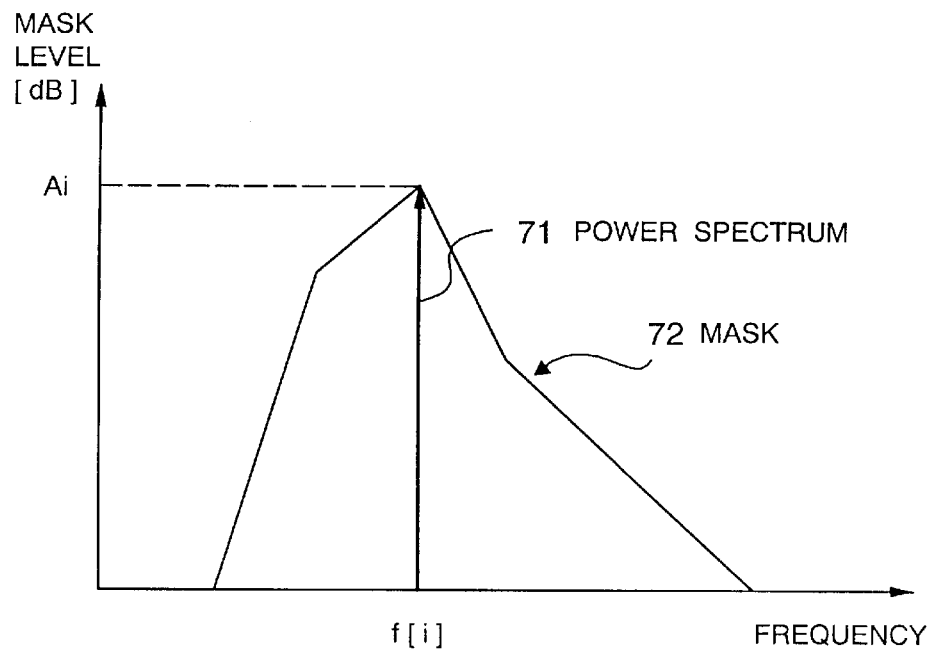
FIG. 8 is a diagram for illustrating the contour of a mask used in a conventional sound signal processing circuit.

The FFT circuit 12, upon receiving 1024 input sound samples 11, performs the fast Fourier transform to make sample output of 512 power spectrum samples. The input sound samples 11 and the FFT circuit 12 are the same as those in the conventional circuit shown in FIG. 7. But, the present invention does not classify the input sound samples 11 into the pure sound and the noise unlike the conventional one. Thus, the disadvantage of the conventional circuit that the volume of processing is varied depending on the entered sound can be remedied.

It is to be understood that the number of samples (1024) of the input sound samples 11 in the FFT circuit 12 and the number of samples (512) of the power spectrum samples are mere examples.

As to the 512 power spectrum samples calculated by the FFT circuit 12, the sub-sampling circuit 13 integrates a prescribed number of power spectra having a high frequency into one power spectrum sample according to the man's sense of hearing that the ability of discriminating frequencies becomes poor as the frequencies become higher.

The mask calculating circuit 14 uses the power spectrum samples which were sub-sampled by the sub-sampling circuit 13 to calculate a mask 15 which indicates a sound level that is a minimum level a man can hear.

Figure 2:
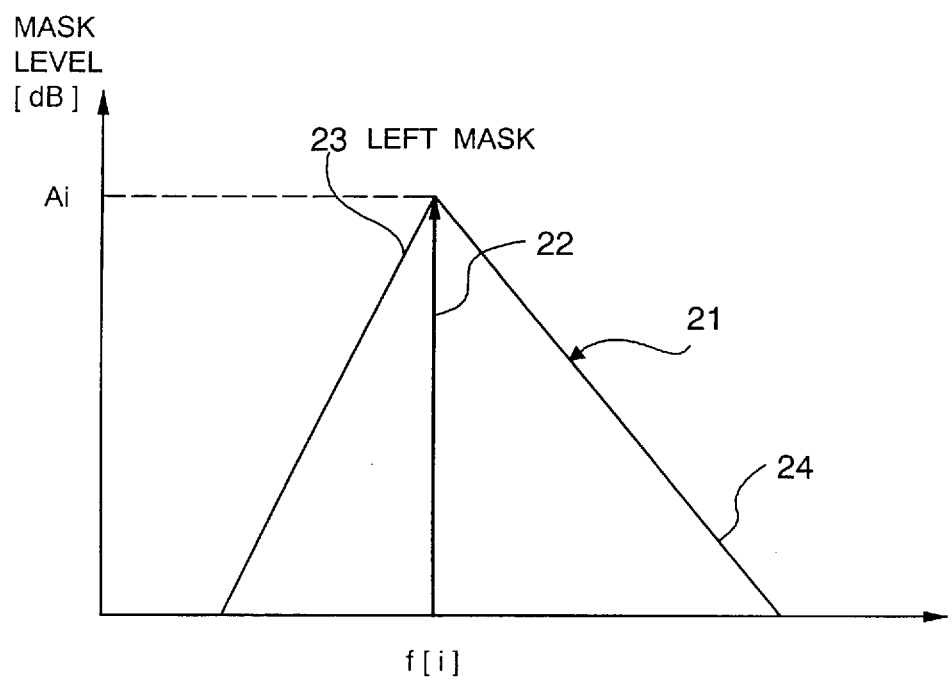
FIG. 2 is a diagram for illustrating the contour of a mask used in the sound signal processing circuit according to the embodiment.

Calculation by the mask calculating circuit 14 for calculating the mask 15 will be described in detail with reference to FIG. 2, FIG. 3, FIG. 4, FIG. 5 and FIG. 6. FIG. 2 shows a mask 21 when a frequency f[i] has a power spectrum 22 with a magnitude a[i]. Conventionally, the mask's contour was changed according to whether the power spectrum was the pure sound component or the noise component or according to the magnitude of the power spectrum. But, in the present invention, the mask's contour is the same for all power spectra.

In FIG. 2, the horizontal axis indicates a frequency, and the vertical axis a mask level. The vertical axis indicates in the unit of decibel. Value A [i] of the power spectrum 22 is expressed as follows.

$$A[i] = 10 \log_{10} a[i]$$

When it is assumed that the inclination or slope of a left mask 23 of this mask is (p) and that of a right mask 24 is (-q), the mask's magnitude m[i](f) is determined as follows (expressed not in decibel but real value).

| | |
|---|---|
| $m[i](f) = a[i]*10^{-p/(f-f[i])}$ | (f < f[i]) |
| $m[i](f) = a[i]$ | (f = f[i]) |
| $m[i](f) = a[i]*10^{-q/(f-f[i])}$ | (f > f[i]) |

Figure 3A:
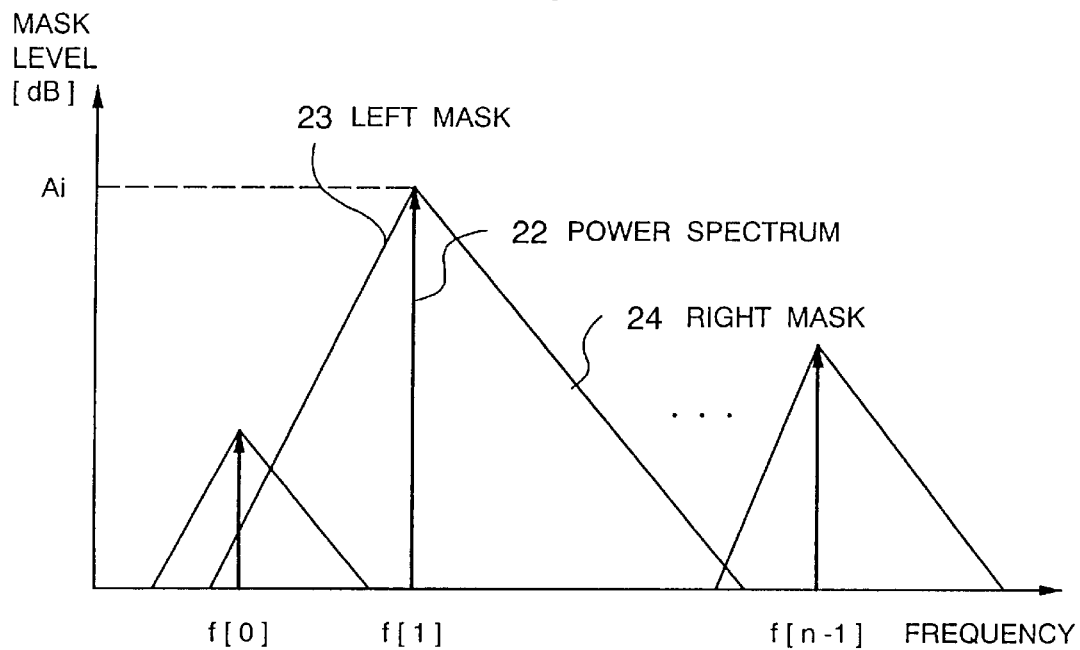
FIG. 3 is a diagram for illustrating the add operation of masks in the sound signal processing circuit according to the embodiment.
Figure 3B:
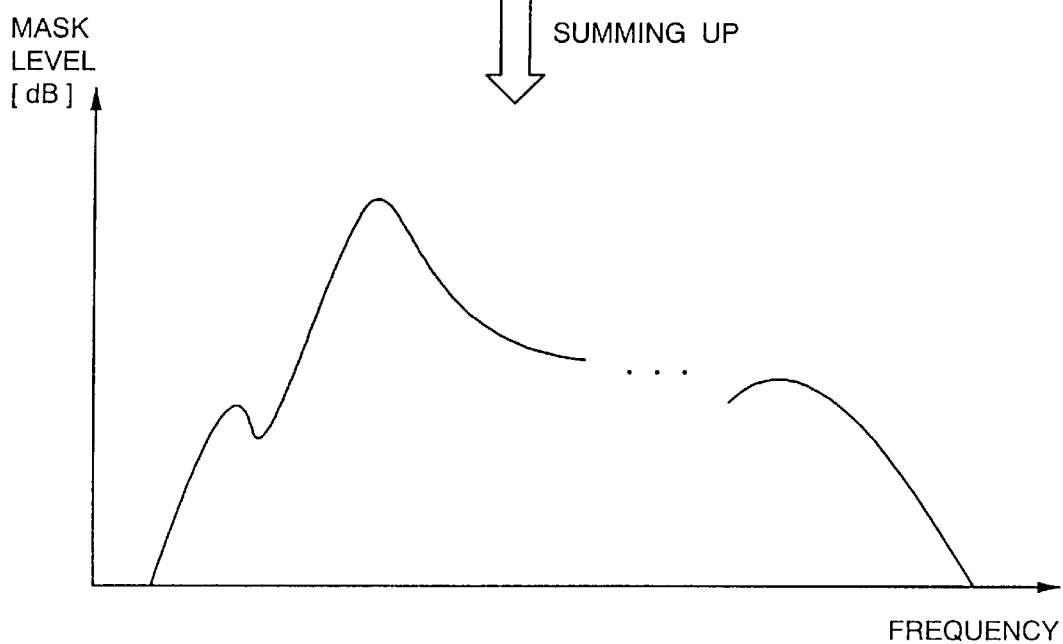

By determining this mask m[i](f) for each power spectrum of each frequency as shown in FIG. 3 and summing up (addition) the results, the added result of masks is attained as shown in FIG. 3.

Figure 4:
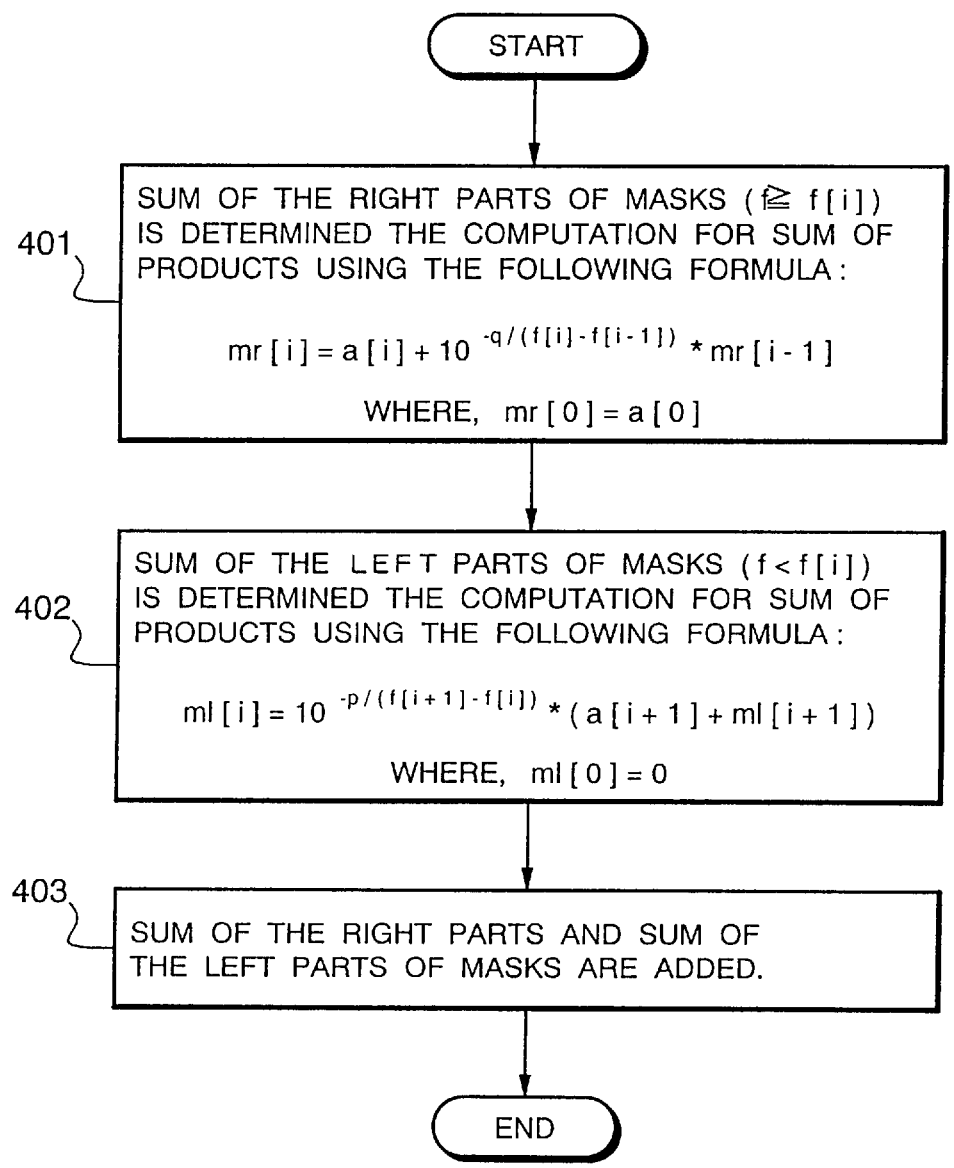
FIG. 4 is a flowchart for illustrating a flow of the add operation of masks in the sound signal processing circuit according to the embodiment.

The flowchart of FIG. 4 shows a flow of the adding process of masks in this embodiment. The adding process of masks by the mask calculating circuit 14 will be described with reference to the flowchart of FIG. 4, FIG. 5 and FIG. 6. In FIG. 3, the power spectra are on (n) numbers of frequencies f[0], f[1], . . . f[n-1].

Figure 5:
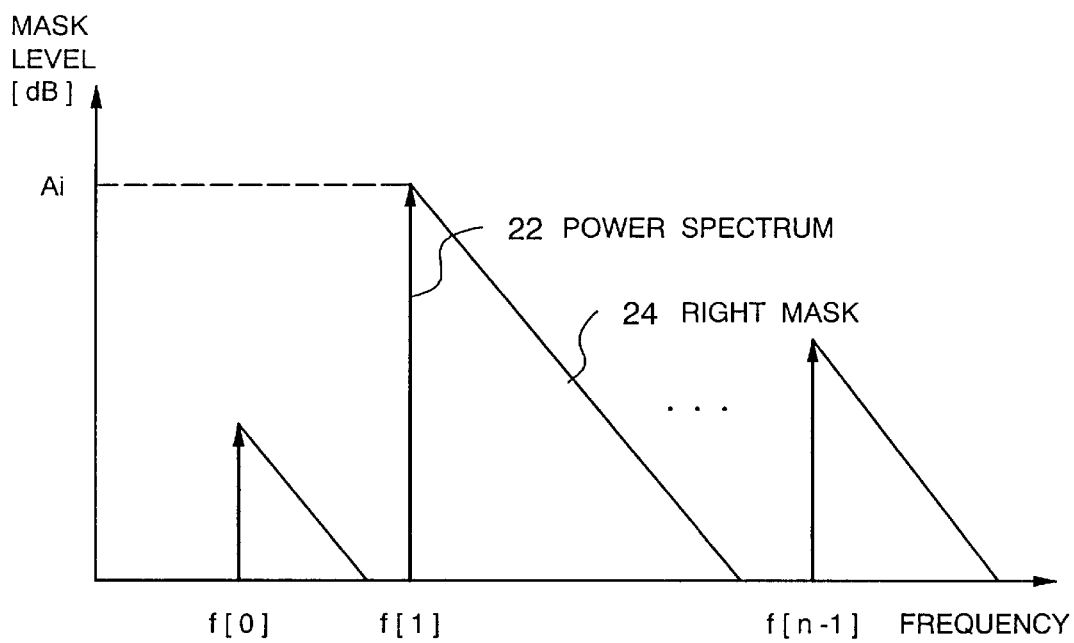
FIG. 5 is a diagram for illustrating the add operation of masks on the right side of a power spectrum.
Figure 6:
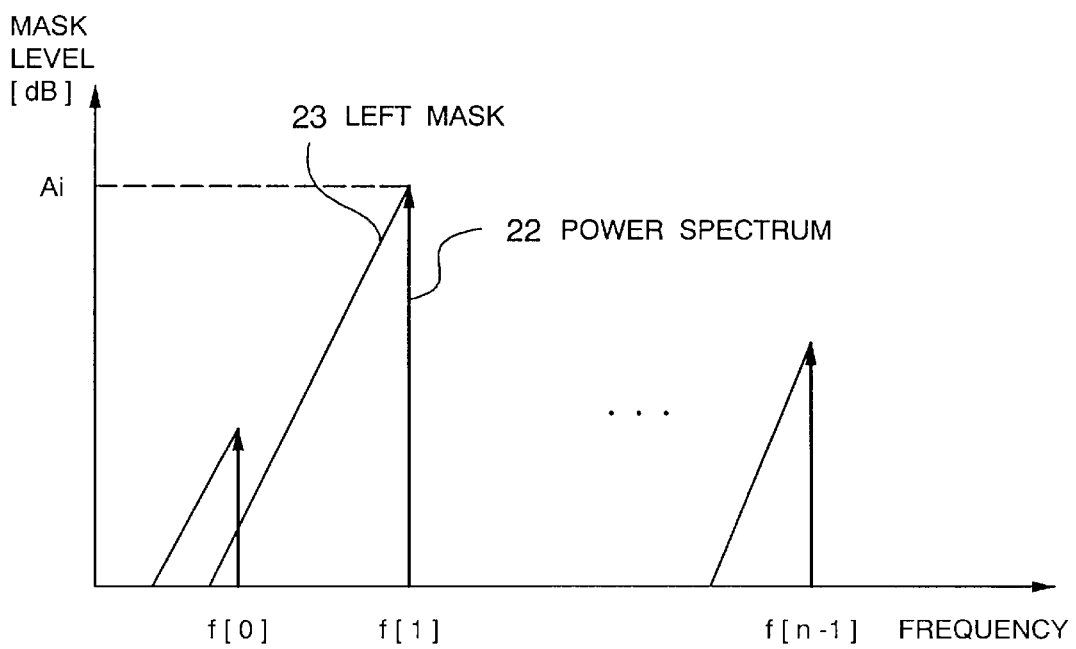
FIG. 6 is a diagram for illustrating the add operation of masks on the left side of a power spectrum.

In the adding process, as shown in FIG. 4, FIG. 5 and FIG. 6, each mask is divided into right (f≦f[i]) and left (f<f[i]) parts as shown in FIG. 2 and respective parts are summed up, then the obtained results are further summed up mutually.

Addition of the right parts (f≦f[i]) will be described first. When the mask summed up at the frequency f[i] is assumed to be mr[i], this mr[i] is calculated from a low frequency, namely f[0], in order.

A mask mr[0] at the frequency f[0] is calculated as follows because it is only a mask of a power spectrum at the frequency f[0].

$$mr[0] = a[0]$$

A mask mr[1] at the frequency f[1] is calculated as follows by adding the mask of a power spectrum at the frequency f[1] and a mask of a power spectrum at a frequency lower than f[1], namely at the frequency f[0].

$$mr[1] = a[0]*10^{-q/(f[1]-f[0])}$$

A mask mr[2] at a frequency f[2] is calculated as follows by adding the mask of a power spectrum at the frequency f[2] and masks of a power spectra at a frequency lower than f[2], namely masks at the frequency f[1], and of the power spectrum at the frequency f[0].

$$\begin{aligned} mr[2] &= a[2] + a[1]*10^{-q/(f[2]-f[1])} + a[0]*10^{-q/(f[2]-f[0])} \\ &= a[2] + 10^{-q/(f[2]-f[1])} * \{a[1] + a[0]*10^{-q/(f[1]-f[0])}\} \\ &= a[2] + 10^{-q/(f[2]-f[1])} * mr[1] \end{aligned}$$

Accordingly, a mask mr[i] at a frequency f[i] is calculated as follows.

$$mr[i] = a[i] + 10^{-q/(f[i]-f[i-1])} * mr[i-1]$$

By precalculating $10^{-q/(f[i]-f[i-1])}$ to prepare a table, this calculation can be completed by a single computation for sum of products (merely a sum and a product, but a combination of calculation at adjacent frequencies). In other words, when there are (n) power spectra, summing up of the right parts of the masks of these spectra can be made by a single computation for sum of products at one frequency except when i=0. Therefore, when there are (n) frequencies, the computation for sum of products can be performed (n-1) times (FIG. 4, step 401).

Now, the sum of the left parts (f<[i]) of masks will be described. The sum of the left parts of masks is performed almost in the same way as the sum of the right parts. When it is assumed that a mask added at a frequency f[i] is ml[i], this mask ml[i] is calculated from a high frequency, namely f[n-1], in order.

A mask ml[n-1] at the frequency f[n-1] does not have a power spectrum at a frequency higher than the frequency f[n-1], so that it is calculated as follows.

$$ml[n-1] = 0$$

Since a mask ml[n-2] at a frequency f[n-2] results from the sum of masks of power spectra at frequencies higher than the frequency f[n-2], it is calculated as follows.

$$ml[n-2] = a[n-1]*10^{-p/(f[n-1]-f[n-2])}$$

Since a mask ml[n-3] at a frequency f[n-3] results from the sum of masks of power spectra at frequencies higher than the frequency f[n-3], it is calculated as follows.

$$\begin{aligned} ml[n-3] &= a[n-2]*10^{-p/(f[n-2]-f[n-3])} + a[n-1]* \\ &\quad 10^{-p/(f[n-1]-f[n-3])} \\ &= 10^{-p/(f[n-2]-f[n-3])} * \{a[n-2] + a[n-1]* \\ &\quad 10^{-p/(f[n-1]-f[n-2])}\} \\ &= 10^{-p/(f[n-2]-f[n-3])} * 2(a[n-2] + ml[n-2]) \end{aligned}$$

Accordingly, the mask ml[i] at the frequency f[i] is calculated as follows.

$$ml[i] = 10^{-p/(f[i+1]-f[i])} * (a[i+1] + ml[i+1])$$

By precalculating $10^{-p/(f[i+1]-f[i])}$ to prepare a table, this calculation can also be completed by a single computation for sum of products (merely a sum and a product, but a combination of calculation at adjacent frequencies). And, when there are (n) frequencies, calculation can be made by performing the computation for sum of products (n−1) times except when i=n−1 (FIG. 4, step 402).

A sum mt[i] of masks at the frequency f[i] can be calculated by adding the sum mr[i] for the right parts of the masks and the sum ml[i] for the left parts of the masks at the frequency f[i]. Therefore, a sum of masks for the (n) frequencies can be calculated by adding (n) times (FIG. 4, step 403).

Accordingly, the volume of operation required to get the sum of each mask on power spectrum samples of the (n) frequencies from (n) power spectrum samples includes (2n−2) times of the computation for sum of products and (n) times of the sum. According to the flowchart shown in FIG. 4, after performing the computation for sum of products on the right parts of masks (f≧f[i], the computation for sum of products on the left parts of masks (f<f[i]) is performed, and the results of both computations for sum of products are added. And, it is to be understood that either of the computations for sum of products can be performed first as desired.

Even when the numeral (n) increases, the volume of operation simply increases in proportion to the increase of (n), and does not increase steeply by the order of the square of (n) as in prior art. And, the value (n) was conventionally variable according to the input sound, but not in this embodiment. Accordingly, when the value (n) is determined, a mask calculating circuit having a scale suitable to the determined value can be provided. And, it is not necessary to provide a calculating circuit having a higher arithmetic capacity on the assumption that the value (n) would increase to exceed an assumed level unlike prior art. Besides, the volume of processing does not extremely increase according to the input sound, and the processing does not fail to produce noises unlike prior art.

Since the mask contour with respect to all power spectra is determined to a prescribed form (the inclination (−q) of the right mask and the inclination (p) of the left mask of the power spectrum are constant) simpler than in prior art, an encoded sound may be deteriorated, but such deterioration can be suppressed low because the ability of discriminating frequencies is enhanced by decreasing the number of power spectrum samples to be integrated into one group when the number of power spectrum samples is decreased by integrating into groups of a prescribed number of power spectrum samples in the sub-sampling processing.

In an evaluation of auditory sensation that the result from encoding by the sound signal processing circuit of the present invention and the result from encoding by a conventional sound signal processing circuit were entered into and decoded by a decoder, then entered into an audio system for audition; three persons having ordinary audibility substantially could not distinguish a difference between them. This result would prove the effectiveness of the invention that can reduce the volume of operation without deteriorating quality of sound.

As described above, according to the invention, a contour which is expressed in a certain unit mask function for every prescribed number of power spectrum samples is determined to be a mask for each power spectrum sample, and the masks of respective power spectrum samples are summed to calculate a mask level, so that the volume of calculation required for the computation of a mask level can be decreased.

And, since the number of power spectrum samples does not change depending on the input sound, when the number of power spectrum samples is determined, arithmetic means having a scale suitable to the determined number can be provided. Thus, it is not necessary to provide large-scale arithmetic means on the assumption that the volume of processing would increase.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A sound signal processing circuit for calculating a mask level of a prescribed number of input sound samples which comprises:

means for inputting input sound samples of digitized speech;

fast Fourier transform means which performs a fast Fourier transform on said input sound samples and outputs first power spectrum samples decreased in number to one-half the number of input sound samples, sub-sampling means which produces a prescribed number of second power spectrum samples by sub-sampling processing of adding said first power spectrum samples by a prescribed number to make a single spectrum, and mask calculating means which calculates a mask level of said second power spectrum samples by determining a contour, expressed in a prescribed unit mask function for each of said second power spectrum samples, as a mask for every second power spectrum and adding said masks from the second power spectrum samples to calculate the mask level, wherein as to n numbers of said second power spectrum samples at frequencies f(0) to f(n−1), the i th (0≦i≦n−1) sample of said second power spectrum samples is determined to have a magnitude a(i), a frequency f(i) and a mask slope (p), and said unit mask function with respect to said second power spectrum sample at a frequency f is determined to be $mi(f)=a(i)*10^{-p/10|f-f(i)|}$.

2. A sound signal processing circuit for calculating a mask level of a prescribed number of input sound samples which comprises:

means for inputting input sound samples of digitized speech;

fast Fourier transform means which performs a fast Fourier transform on said input sound samples and outputs first power spectrum samples decreased in number to one-half the number of input sound samples, sub-sampling means which produces a prescribed number of second power spectrum samples by sub-sampling processing of adding said first power spectrum samples by a prescribed number to make a single spectrum, and mask calculating means which calculates a mask level of said second power spectrum samples by determining a contour, expressed in a prescribed unit mask function for each of said second power spectrum samples, as a mask for every second power spectrum and adding said masks from the second cower spectrum samples to calculate the mask level, wherein said mask calculating means calculates a mask level independently on right masks and left masks of said second power spectrum samples.

3. The sound signal processing circuit as set forth in claim 2, wherein the mask expressed in said unit mask function has a contour which has a given slope on right and left sides of said second power spectrum sample.

4. A sound signal processing circuit for calculating a mask level of a prescribed number of input sound samples which comprises:

means for inputting input sound samples of digitized speech;

fast Fourier transform means which performs a fast Fourier transform on said input sound samples and outputs first sower spectrum samples decreased in number to one-half the number of input sound samples, sub-sampling means which produces a prescribed number of second power spectrum samples by sub-sampling processing of adding said first power spectrum samples by a prescribed number to make a single spectrum, and mask calculating means which calculates a mask level of said second power spectrum samples by determining a contour, expressed in a prescribed unit mask function for each of said second power spectrum samples, as a mask for every second power spectrum and adding said masks from the second power spectrum samples to calculate the mask level, wherein said mask calculating means divides into right masks and left masks of said second power spectrum samples, and sums the right masks of said second power spectrum samples sequentially from said second power spectrum sample at a low frequency to calculate a mask level of the right side of said second power spectrum samples and sums the left masks of said each second power spectrum sample sequentially from said second power spectrum sample at a high frequency to calculate a mask level of the left side of said second power spectrum samples.

5. A sound signal processing circuit for calculating a mask level of a prescribed number of input sound samples which comprises:

means for inputting input sound samples of digitized speech;

fast Fourier transform means which performs a fast Fourier transform on said input sound samples and outputs first power spectrum samples decreased in number to one-half the number of input sound samples, sub-sampling means which produces a prescribed number of second power spectrum samples by sub-sampling processing of adding said first power spectrum samples by a prescribed number to make a single spectrum, and mask calculating means which calculates a mask level of said second power spectrum samples by determining a contour, expressed in a prescribed unit mask function for each of said second power spectrum samples, as a mask for every second power spectrum and adding said masks from the second power spectrum samples to calculate the mask level, wherein as to (n) numbers of said second power spectrum samples at frequencies f(0) to f(n−1), said mask calculating means divides into right masks and left masks of said second power spectrum samples, and sums the right masks of said respective second power spectrum samples sequentially from said second power spectrum sample at the frequency f(0) to calculate a mask level of the right side of said second power spectrum samples and sums the left masks of said respective second power spectrum samples sequentially from said second power spectrum sample at the frequency f(n−1) to calculate a mask level of the left side of said second power spectrum samples.

6. A sound signal processing circuit for calculating a mask level of a prescribed number of input sound samples which comprises:

means for inputting input sound samples of digitized speech;

fast Fourier transform means which performs a fast Fourier transform on said input sound samples and outputs first power spectrum samples decreased in number to one-half the number of input sound samples, sub-sampling means which produces a prescribed number of second power spectrum samples by sub-sampling processing of adding said first power spectrum samples by a prescribed number to make a single spectrum, and mask calculating means which calculates a mask level of said second power spectrum samples by determining a contour, expressed in a prescribed unit mask function for each of said second power spectrum samples, as a mask for every second power spectrum sample, and adding said masks to calculate the mask level from the second power spectrum samples;

said mask calculating means, dividing said second power spectrum samples into right masks and left masks, summing the right masks of said respective second power spectrum samples sequentially from said second power spectrum sample at a low frequency to calculate a mask level of the right side of said second power spectrum samples, and summing the left masks of said respective second power spectrum samples sequentially from said second power spectrum sample at a high frequency to calculate a mask level of the left side of said second power spectrum samples, and adding the right masks and the left masks of said second power spectrum samples to calculate a mask level from said second power spectrum samples.

7. The sound signal processing circuit as set forth in claim 6, wherein the mask expressed in said unit mask function has a contour which has a given slope on right and left sides of said second power spectrum sample.

8. The sound signal processing circuit as set forth in claim 6, wherein as to n numbers of said second power spectrum samples at frequencies f(0) to f(n−1), the i-th ($0 \leq i \leq n-1$) sample of said second power spectrum samples is determined to have a magnitude a(i), a frequency f(i) and a mask slope (p); and said unit mask function with respect to said second power spectrum sample at a frequency f is determined to be $mi(f)=a(i)*10^{-p/10|f-f(i)|}$.

9. The sound signal processing circuit as set forth in claim 6, wherein as to (n) numbers of said second power spectrum samples at frequencies f(0) to f(n−1), said mask calculating means divides into right masks and left masks of said second power spectrum samples, and sums the right masks of said respective second power spectrum samples sequentially from said second power spectrum sample at the frequency f(0) to calculate a mask level of the right side of said second power spectrum samples and sums the left masks of said respective second power spectrum samples sequentially from said second power spectrum sample at the frequency f(n−1) to calculate a mask level of the left side of said second power spectrum samples.

10. The sound signal processing circuit as set forth in claim 6, wherein as to (n) numbers of said second power spectrum samples at frequencies f(0) to f(n−1), the i-th sample of said second power spectrum samples is determined to have a magnitude a(i), a frequency f(i), a right mask slope (−q) and a left mask slope (p);

said mask calculating means calculates based on $mr(i) = a(i) + 10^{-q/(f(i)-f(i-1))} * mr(i-1)$ the right masks of said second power spectrum samples at the frequency f(i), and calculates based on $ml(i) = 10^{-p/(f(i+1)-f(i))} * (a(i+1) + ml(i+1))$ the left masks of said second power spectrum samples at the frequency f(i).

11. The sound signal processing circuit as set forth in claim 10, wherein said mask calculating means has a table prepared by previously calculating $10^{-q/(f(i)-f(i-1))}$ in the operation for said right masks and a table prepared by previously calculating $10^{-p/(f(i+1)-f(i))}$ in the operation for said left masks.

* * * * *

UNITED STATES PATENT AND TRADEMARK OFFICE
CERTIFICATE OF CORRECTION

PATENT NO. : 5,890,107
DATED : March 30, 1999
INVENTOR(S) : Yoshitaka Shibuya

It is certified that error appears in the above-identified patent and that said Letters Patent is hereby corrected as shown below:

Column 1, Line 37: "and those as" should read --and as--

Column 5, Line 53: "$(f \leq f[i])$" should read --$(f \geq f[i])$--

Column 5, Line 56: "$(f \leq f[i])$" should read --$(f \geq f[i])$--

Column 6, Line 4: " mr[1]=a[0]" should read --mr[1]=a[1]+[0]--

Column 8, Line 63, Claim 2: "cower" should read --power--

Column 9, Line 12, Claim 4: "sower" should read --power--

Signed and Sealed this

Second Day of January, 2001

Attest:

Q. TODD DICKINSON

Attesting Officer

Commissioner of Patents and Trademarks